(12) United States Patent
Nilov

(10) Patent No.: US 8,573,444 B2
(45) Date of Patent: Nov. 5, 2013

(54) VARIABLE FLOW DISPENSER WITH ACTUATION OR FEEDBACK CABLE

(76) Inventor: Maksim Nilov, Philadelphia, PA (US)

( * ) Notice: Subject to any disclaimer, the term of this patent is extended or adjusted under 35 U.S.C. 154(b) by 197 days.

(21) Appl. No.: 13/053,705

(22) Filed: Mar. 22, 2011

(65) Prior Publication Data

US 2012/0241472 A1    Sep. 27, 2012

(51) Int. Cl.
*B65D 35/28* (2006.01)

(52) U.S. Cl.
USPC ............. 222/95; 222/287; 222/309; 222/282; 222/305; 222/319

(58) Field of Classification Search
USPC ........ 222/92, 309, 282, 287, 319, 372, 383.1, 222/305, 95
See application file for complete search history.

(56) References Cited

U.S. PATENT DOCUMENTS 2,778,534 A * 1/1957 Ramsey ..................... 222/129.4
3,537,228 A * 11/1970 Cremieux ....................... 53/506

* cited by examiner

*Primary Examiner* — Frederick C Nicolas
*Assistant Examiner* — Michael J Melaragno
(74) *Attorney, Agent, or Firm* — Charles L. Riddle; Riddle Patent Law, LLC

(57) ABSTRACT

A fluid delivery device 1000 comprises a piston assembly 1100, a translatable pivot guide system 1200, and a pneumatic aspirator 1300; the piston assembly 1100 functionally acting as the fluid handler, admitting and ejecting fluid from an inlet 1133 to an outlet 1135; the translatable pivot guide system 1200 is a user controllable system adapted to cooperate with the piston assembly 1100 for allowing a user to selectively set the volume of fluid ejected by the piston assembly 1100; and the pneumatic aspirator 1300 is a pressure control system, adapted to cooperate with the piston assembly 1100 and the translatable pivot guide system 1200, for regulating pressure within the piston assembly 1100, effective to allow the piston assembly 1100 to eject fluid during dispensing and to admit fluid during reset; wherein two or more instances of the present invention fluid delivery device 1000 are used together to effect metered fluid mixing applications.

3 Claims, 6 Drawing Sheets

VARIABLE FLOW DISPENSER WITH ACTUATION OR FEEDBACK CABLE

CROSS REFERENCE TO RELATED APPLICATIONS

Not applicable

STATEMENT AS TO FEDERALLY SPONSORED RESEARCH

Not applicable.

BACKGROUND OF INVENTION a. Field of Invention

The invention relates generally to metered fluid dispensing devices. Particularly, the invention relates to a modular fluid dispenser capable of ejecting variable fluid volumes in response to operation of the dispenser, which is preferably by actuation of a cord, but alternately by negative pressure at an output port of said dispenser.

b. Background of Invention

Visual artists, illustrators and painters want the ability to formulate color mixtures by manipulating tactile controls to establish said mixtures' component proportions. To this end, the device taught herein will allow the end user to synchronously deliver a mixture of any number of components, in any proportion to a spray gun or an airbrush, or to a receiving vessel whose internal pressure can be held lower than ambient to initiate dispensing.

The current invention not only addresses the need to produce a mixture of multiple components in which said components maintain a set proportion to one another but also aims to provide a solution that is infinitely adjustable, precise and relies on a semi rigid container to collapse towards a low internal volume state along a variable geometry path from some starting point on said path. Disclosed herein is a module that is able to volumetrically maintain exact mixture component ratio in concert with a system of such modules by mutually reinforcing the ratio to be dispensed via a shared feedback cable.

b. Description of Related Art

Fluid dispensers which form a mixture from individual fluid components are known, and are taught by U.S. Pat. Nos. 6,527,201 and 3,353,716.

The above prior art devices are advantageously portable due to light weight construction when compared to alternatives whose embodiments require an electrical power source or an electronic central processing unit. The former device consumes compressed air, while the latter device is hand powered. Unfortunately, the prior art is severely limited as follows: The Chamelion color changer, detailed in U.S. Pat. No. 6,527,201 can mix and deliver just two colors simultaneously. This constrains the users' color choices to narrow areas of the colorimetric gamut unless they take it upon themselves to manage, swap and manipulate the order of the component colors' supply bottles. This system may also suffer from nonlinearities that are imposed by valve flow curves that are characteristic of each ratio controlling orifice of said device as end user demand for the dispensable fluids varies.

The device taught by U.S. Pat. No. 3,353,716 enables incremental mixture formation by manually actuating respective component's control knobs in order to dispense each component. The mixture's components are thereby asynchronously introduced into the said dispenser's output receptacle or vessel.

Notwithstanding the prior art, the present invention is neither taught nor rendered obvious thereby.

c. Objects and Advantages

An objective of current invention is to eliminate complex pumps, electronics and feedback sensors, thereby providing a mechanism that stores and meters fluids and is sensitive to feedback from, and is able to adjust its dispensing speed in response to other like dispensers, so that a multitude of dispensers may mutually reinforce the same/common dispensing speed but dispense at individual ratios to said speed.

A further objective is to provide a design for a dispenser module system in which semi rigid collapsible containers are actuated by a shared cable and dispense a precisely proportioned mixture of two or more components.

SUMMARY OF INVENTION

The invention is a fluid delivery device 1000. In a preferred embodiment of the present invention, the fluid delivery device 1000 comprises a piston assembly 1100, a translatable pivot guide system 1200, and a pneumatic aspirator 1300. The piston assembly 1100 functionally acts as the fluid handler, admitting and ejecting fluid from an inlet 1133 to an outlet 1135. The translatable pivot guide system 1200 is a user controllable system adapted to cooperate with the piston assembly 1100 for allowing a user to selectively set the volume of fluid ejected by the piston assembly 1100. The pneumatic aspirator 1300 is a pressure control system, adapted to cooperate with the piston assembly 1100 and the translatable pivot guide system 1200, for regulating pressure within the piston assembly 1100, effectively allowing the piston assembly 1100 to eject fluid during dispensing and to admit fluid during reset.

Two or more instances of the present invention fluid delivery device 1000 are used together to effect metered fluid mixing applications.

Additional features, advantages, and embodiments of the invention may be set forth or apparent from consideration of the following detailed description. Moreover, it is to be understood that both the foregoing summary of the invention and the following detailed description are exemplary and intended to provide further explanation without limiting the scope of the invention.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Figure 1:
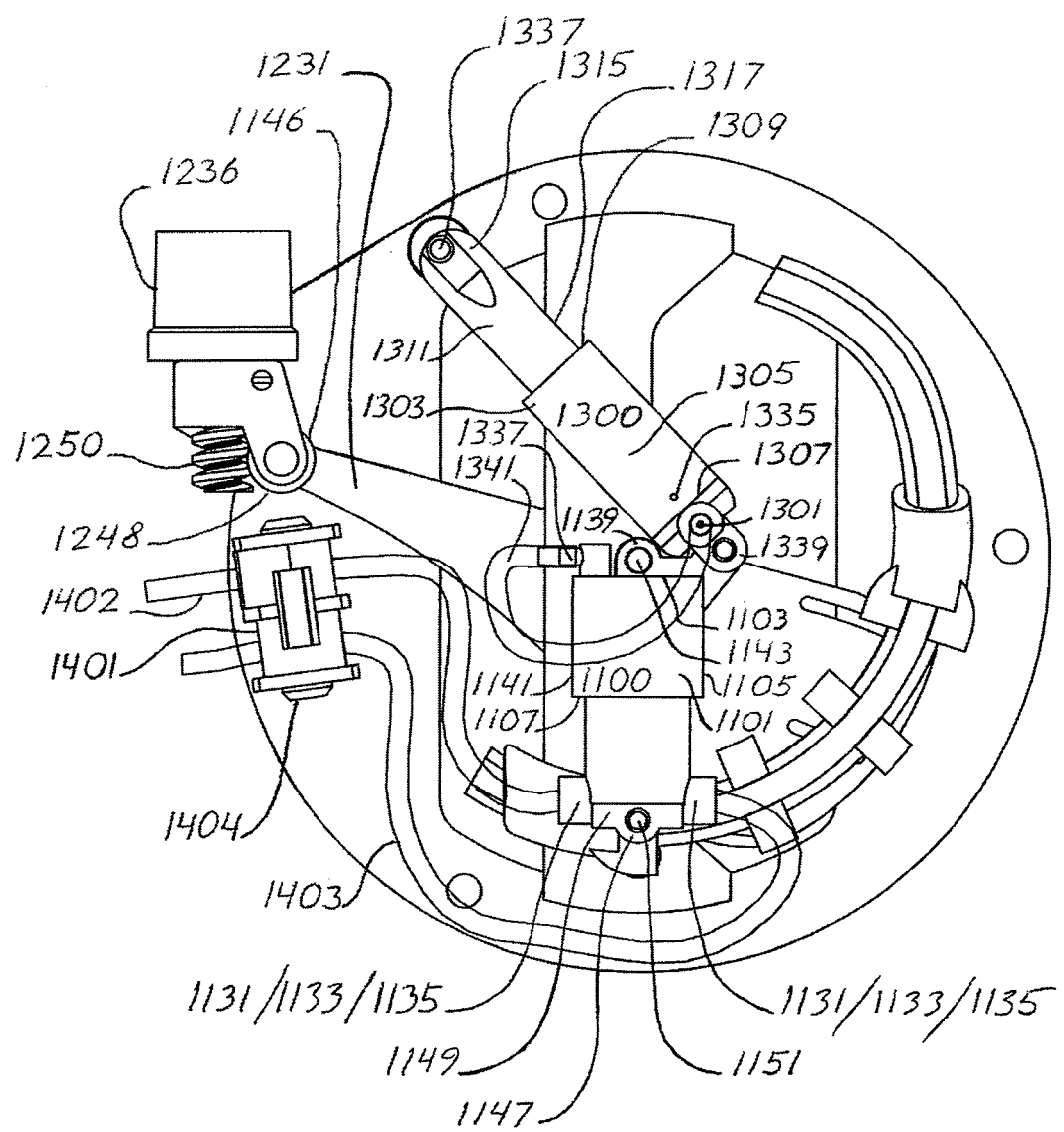
FIG. 1 is a plan view of the fluid delivery device 1000.

Turning to the drawings, there is shown a fluid delivery device 1000 for delivering a fluid. In a preferred embodiment of the present invention, the fluid delivery device 1000 comprises a piston assembly 1100, a translatable pivot guide system 1200, and a pneumatic aspirator 1300. The piston assembly 1100 functionally acts as the fluid handler, admitting and ejecting fluid from an inlet 1133 to an outlet 1135. The translatable pivot guide system 1200 is a user controllable system adapted to cooperate with the piston assembly 1100 for allowing a user to selectively set the volume of fluid ejected by the piston assembly 1100. The pneumatic aspirator 1300 is a pressure control system, adapted to cooperate with the piston assembly 1100 and the translatable pivot guide system 1200, for regulating pressure within the piston assembly 1100, effectively allowing the piston assembly 1100 to eject fluid during dispensing and to admit fluid during reset.

Referring to FIGS. 1-4, the present invention fluid delivery device 1000 comprises a piston assembly 1100 having a receiver cup 1101 having a cup base wall 1103 and a cup sidewall 1105 connected to the cup base wall 1103 and extending therefrom to form a cup rim 1107. The receiver cup forms a receiver volume 1109 existing between the cup base wall 1103, the cup sidewall 1105, and the cup rim 1107.

The piston assembly 1100 further includes a plunger housing 1111 adapted to sealably and slidably fit within the receiver cup 1101. The plunger housing 1111 has a plunger base wall 1113 and a plunger wall 1115 connected to the plunger base wall 1113 and extending therefrom to form a plunger rim 1117. The plunger housing 1111 forms a plunger volume 1119 existing between the plunger base wall 1113, the plunger wall 1115, and the plunger rim 1117.

The plunger housing 1111 also includes a collapsible reservoir 1121 disposed within the plunger volume 1119 for containing a fluid. The collapsible reservoir 1121 has at least one reservoir 1123 wall defining and enclosing a reservoir volume 1125, and at least one reservoir port 1127 extending through the reservoir wall 1123 for communicating a fluid with the reservoir volume 1125.

A light spring 1129 is inset within the receiver volume 1109 of the receiver cup 1101 disposed to engage the receiver cup 1101 and the plunger housing 1111 for resisting compression of the plunger housing 1111 within the receiver cup 1101.

An inlet 1133 and an outlet 1135 are included for communicating the fluid with the at least one reservoir port 1127. A receiver cup port 1137 extends through the receiver cup 1101 for regulating a fluid piston pressure that is exerted on the collapsible reservoir 1121 within the receiver cup 1101 and within the plunger housing 1111 that is exerted on the collapsible reservoir 1121. Discussed in detail below, a pneumatic aspirator 1300 is in communication with the receiver cup port 1137 for regulating the fluid piston pressure by selectively controlling the flow of air in or out of the receiver cup port 1137.

A fixed pivot mount 1139 is connected to or forms part of the receiver cup 1101 at a base wall end 1141 for connecting with a fixed pivot 1143 of a baseplate 1145, and a translatable pivot mount 1147 is connected to or forms part of the plunger housing 1111 at a plunger base wall end 1149 for connecting with a translatable pivot 1151. The fixed pivot mount 1139 is connected with the fixed pivot 1143. The translatable pivot mount 1147 is connected with the translatable pivot 1151.

In operation, the translatable pivot 1151 is caused to travel from a first radial distance 1153 from the fixed pivot 1143 to a radial endpoint 1155 having a second radial distance 1157, the radial endpoint 1155 being less in distance from the fixed pivot 1143 than the first radial distance 1153, thereby causing the plunger housing 1111 to slide further into the receiver volume 1109 and increase the fluid piston pressure. The pneumatic aspirator 1300 is disposed to stop the flow of air out of the receiver cup when the plunger housing 1111 slides into the receiver volume 1109, the fluid piston pressure thereby exerted on the collapsible reservoir 1121 causes the collapsible reservoir 1121 to collapse, ejecting the fluid contained therein through the at least one reservoir port 1127.

The fluid delivery device 1000 is replaceable by any collapsible, semi rigid container, whose internal volume is established or set by the distance between mount points 1143 and 1151.

Referring to FIGS. 2-4 and 6, the fluid delivery device 1000 further includes a translatable pivot guide system 1200 for selectively varying the second radial distance 1157 of the translatable pivot mount 1151 to the fixed pivot 1143. The translatable pivot guide system 1200 generally comprises a cord 1201, a track 1213 and a guideplate 1231.

The cord 1201 has a first end 1203 and a second end 1205. The first end 1203 is attached to the translatable pivot 1151 for moving the translatable pivot 1151 along a path 1207 from a startpoint 1209 to an endpoint 1211 when a pulling force is applied to the second end 1205.

The track 1213 forms the path 1207 traveled by the translatable pivot 1151. The track 1213 is made of a flexible material, and includes a start end 1215 and a finish end 1217, connected to a cord side 1219 and mount side 1221. The start end 1215 has a track pivot mount 1223 for pivotably fixing the start end 1215 to the baseplate 1145 at a baseplate pivot pin 1223a and for defining the startpoint 1209 having a nonvariable radial distance 1225 from the fixed pivot 1143. The finish end 1217 defines the endpoint 1211. The cord side 1219 includes at least one retainer 1227 for holding the cord 1201 to the cord side 1219 of the track 1213 as the cord slides along the track 1213 and for constraining the travel of the first end 1203 of the cord 1201 as said first end 1203 of the cord 1201 travels along the path 1207 from the startpoint 1209 to the endpoint 1211. The mount side 1221 mates to one or more guide pins 1229 extending outwardly for shaping the path 1207 traveled by the translatable pivot 1151. Pivot 1151 connects to cord 1201 via pivot hole 1201a in said cord.

The guideplate 1231 shapes the path 1207 formed by the track 1213. The guideplate 1231 includes a guideplate pivot 1235 extending along an axis 1237 perpendicular to the surface 1233 of the guideplate 1231, rotatably connected to the baseplate 1145 via a guideplate pivot mount 1146, for allowing the surface 1233 to rotate relative to the axis 1237 and the baseplate 1145 when a user rotates the guideplate pivot 1235.

Preferably, rotation of the guideplate pivot 1235 is accomplished with a user control knob 1236 that cooperates with and engages the helicoid gear 1248 of the guideplate pivot shaft 1248 through a worm gear 1250 thereby allowing the user to control the dispense rate. The said worm gear coupling restricts the current dispenser module's internals from rotating the control knob 1236 during dispensing.

The guideplate 1231 has one or more guide channels 1239 extending through the surface 1233 for cooperating with the one or more guide pins 1229 of the track 1213. The one or more guide channels 1239 are shaped to cause the finish end 1217 of the track 1213 to vary in distance from the fixed pivot 1143 as the guideplate 1231 is selectably rotated about the axis.

Figure 6:
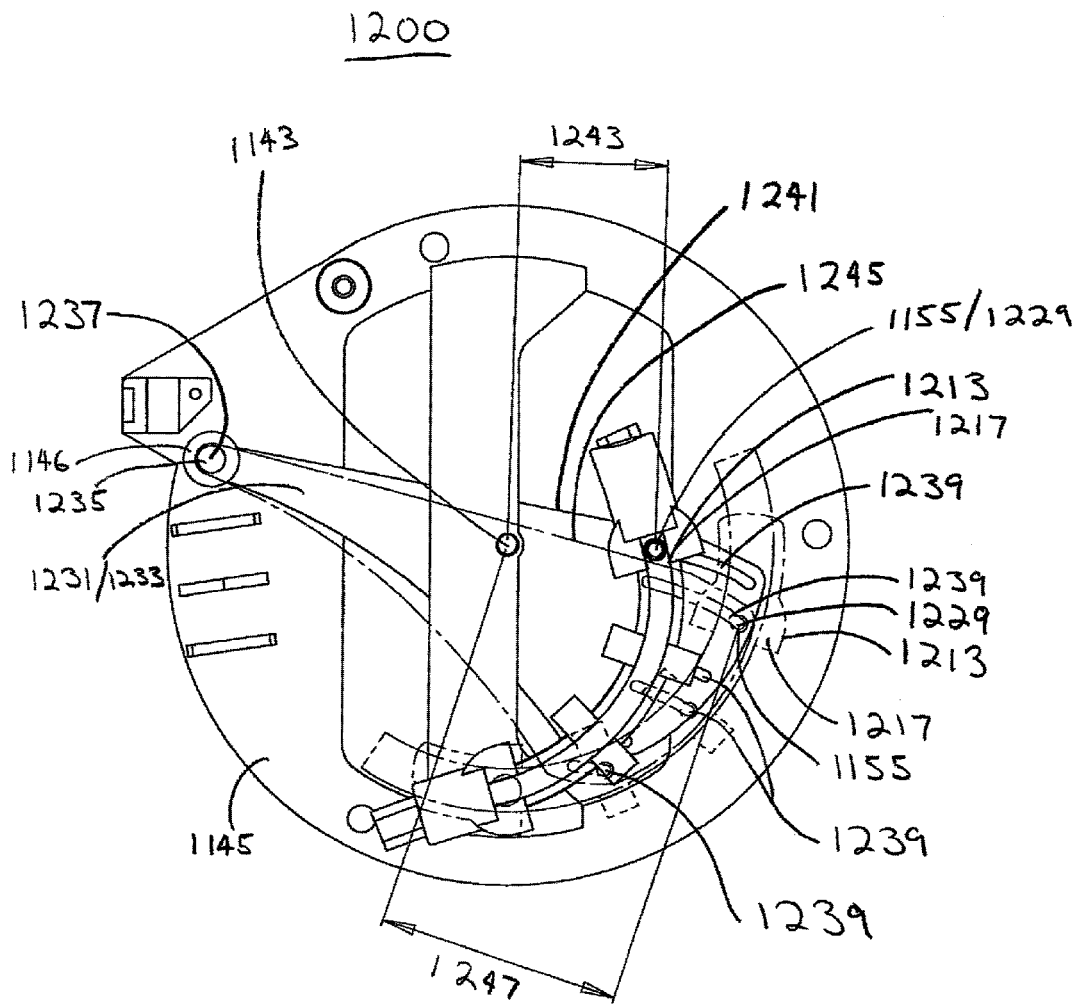
FIG. 6 is a partial plan view showing the translatable pivot guide system 1200 in a first and second position.

Referring to FIG. 6, in operation, the guideplate 1231 is rotated to a first position 1241 relative to the baseplate 1145. The guide channels 1239 cooperate with the one or more guide pins 1229 of the track 1213 to cause the track 1213 to axially deform such that the finish end 1217 of the track 1213 has the radial endpoint 1155 at an initial second radial distance 1243 from the fixed pivot 1143. When the cord 1201 is pulled, the cord 1201 and the translatable pivot 1151 travel along the track 1213 to the radial endpoint 1155 at the second radial distance 1243, causing the plunger housing 1111 of the piston assembly 1100 to slide further in the receiver volume 1109 and increase the fluid piston pressure exerted against the collapsible reservoir 1121. The pneumatic aspirator 1300 is disposed to stop the flow of air out of the receiver cup when the plunger housing 1111 slides into the receiver volume 1109, the fluid piston pressure thereby exerted on the collapsible reservoir 1121 causes the collapsible reservoir 1121 to collapse, ejecting the fluid contained therein through the at least one reservoir port 1127.

The fluid pressure that is exerted on the collapsible reservoir 1121 is relatable to the initial second radial distance 1243, causing the collapsible reservoir 1121 to collapse to a degree relatable to the initial second radial distance 1243 when the translatable pivot 1151 travels from the start end 1215 to the finish end 1217. The volume of the fluid contained therein is ejected also to a degree relatable to the initial second radial distance 1243.

As an example of varying the volume of fluid ejected, the guideplate 1231 is rotated to a second position 1245 relative to the baseplate 1145. The guide channels 1239 cooperate with the one or more guide pins 1229 of the track 1213 to cause the track 1213 to axially deform such that the finish end 1217 of the track has the radial endpoint 1155 at an other second radial distance 1247 differing from the initial second radial distance 1243. When the cord 1201 is pulled, the cord 1201 and the translatable pivot 1151 travel along the track 1213 to the radial endpoint 1155 at the other second radial distance 1247.

In this example, the fluid piston pressure that is exerted on the collapsible reservoir 1121 is relatable to the other second radial distance 1243, causing the collapsible reservoir 1121 to collapse to a degree relatable to the other second radial distance 1243 when the translatable pivot 1151 travels from the start end 1215 to the finish end 1217. The volume of the fluid contained therein is ejected to a degree relatable to the other second radial distance 1243.

Actuation of the cord 1201 may be by a pulling force applied to the cord 1201. Fluid dispensing also may be actuated by a downstream fluid pressure at the outlet 1135, causing the translatable pivot 1151 to travel along the track 1213 to the radial endpoint 1155 at a second radial distance 1247. The shape of the track 1213 defining the volume of the fluid ejected by setting the second radial distance 1243. Similarly, if the cord is pulled a distance that is short of the full distance permitted by the track 1213, the fluid dispensed is relatable to the distance the cord 1201 is pulled and the shape taken by the track 1213.

Turning to FIG. 6, there is shown a plot of various exemplarily track 1213 configurations enabled by the translatable pivot guide system 1200. One track 1213 configuration is configured to guarantee no fluid is ejected during the dispense cycle. Another possible track 1213 configuration is maximum disbursement of fluid contents during the dispense cycle. Between the no-flow and max-flow configurations are a continuum of track 1213 shapes and forms.

Referring to FIGS. 1-5, there is shown a preferred embodiment of the pneumatic aspirator 1300, that comprises a pneumatic cylinder 1303, a pneumatic plunger 1311, a diaphragm 1330, and a poppet valve 1333. An aspirator port 1301 communicates pressure with the receiver cup port 1137 and the pneumatic aspirator.

The pneumatic cylinder 1303 has a sidewall 1305 forming a first rim 1307 and a second rim 1309. The pneumatic plunger 1311 slidably and sealingly fits within the sidewall 1305 of the pneumatic cylinder 1303 at the second rim 1309.

The pneumatic plunger 1311 has a proximal end 1313, a distal end 1315, at least one wall 1317 connecting the proximal end 1313 to the distal end 1315, and a plunger passageway 1319 for allowing air to flow from the proximal end 1313 to atmosphere at the distal end 1315. A pressure actuated valve 1321 is fixed to the proximal end 1313 of the pneumatic plunger 1311 and has a periphery 1323 connecting a first surface 1325 to a second surface 1327 and an orifice 1329 extending from the first surface 1325 to the second surface 1327. The orifice 1329 is disposed to be normally closed and to open to admit flow of air through the valve 1321 into and/or out of the plunger passageway 1319 at a first pressure differential across the valve 1321.

A diaphragm 1330 is sealably fixed within the sidewall 1305 of the pneumatic cylinder 1303 at or near the first rim 1307. The diaphragm has a plunger facing surface 1331 that faces the proximal end 1313 of the plunger for responding to a cylinder pressure existing between the pressure actuated valve 1321 and the plunger facing surface 1331. A poppet valve 1333 is mechanically coupled to the diaphragm 1330 and disposed to communicate flow between the aspirator port 1301 and atmosphere via a passageway 1335 when the pressure seen at aspirator port 1301 exceeds the pressure exerted against the plunger facing surface 1331 of the diaphragm.

The pressure actuated valve 1321 acts as a pressure relief valve when the pressure between the diaphragm 1330 plunger facing surface 1331 and the proximal end 1313 of the pneumatic plunger 1311 is greater than atmospheric pressure. This occurs when the pneumatic plunger 1311 travels into the pneumatic cylinder 1303. The orifice 1329 is sized such that, when the pneumatic plunger 1311 travels into the pneumatic cylinder 1303, a sufficient pressure is maintained to allow the pneumatic plunger 1311 travel into the pneumatic cylinder 1303, and to maintain the poppet valve 1333 seated so that the receiver cup port 1137 is not vented to atmosphere.

The pressure actuated valve 1321 acts as a vacuum relief valve when the pressure between the diaphragm 1330 plunger facing surface 1331 and the proximal end 1313 of the pneumatic plunger 1311 is less than atmospheric pressure. This occurs when the pneumatic plunger 1311 travels away from the pneumatic cylinder 1303. The orifice 1329 is sized such that, when the pneumatic plunger 1311 travels outwardly of the pneumatic cylinder 1303, a sufficient pressure is maintained to allow the pneumatic plunger 1311 travel outwardly of the pneumatic cylinder 1303, and to unseat the poppet valve 1333 so that the receiver cup port 1137 vents to atmosphere.

In a preferred embodiment, a header is provided that contains the passageway 1335, the pressure aspirator port 1301, and the seat of the poppet valve 1333. The header is butt/lap (glued) mounted to the cylinder 1303.

The distal end 1315 of the pneumatic plunger 1311 is pivotably mounted to a fixed plunger pivot 1337, and the pneumatic cylinder 1303 is pivotally mounted to an offset pivot mount 1339 of the receiver cup 1101 (by means of a pneumatic plunger mount 1339a and pivot pin 1339b) so as to enable the proximal end 1313 to slidably travel towards or away from the diaphragm 1330 as the translatable pivot 1151 travels to or from the startpoint 1209 to the endpoint 1211. This mechanical cooperation of the pneumatic cylinder 1303 pivotally mounted to the offset pivot mount 1339 of the receiver cup 1101 causes the pneumatic aspirator 1033 to allow the piston assembly 1100 to eject fluid during dispensing and to admit fluid during reset.

During dispensing, as the cord is pulled to cause the translatable pivot mount 1147 to travel from the startpoint 1209 to the endpoint 1211, the offset pivot mount 1339 rotates about the fixed pivot 1143 causing the proximal end 1313 to slidably travel towards the diaphragm 1330 thereby exerting a pressure against the plunger facing surface 1331 that is greater than the aspirator port 1301 pressure, maintaining the poppet valve 1333 seated so that the receiver cup port 1137 is not vented to atmosphere. During reset, as the translatable pivot mount 1147 travels from the endpoint 1211 to the startpoint 1209, the offset pivot mount 1339 rotates about the fixed pivot 1143 mount causing the proximal end 1313 to slidably travel away from the diaphragm 1330 thereby exerting a pressure against the plunger facing surface 1331 that is less than the aspirator port 1301 pressure, which unseats the poppet valve 1333 causing air to flow from the passageway 1335 to the receiver volume 1109 via the aspirator port 1301 and the receiver cup port 1137, which are connected via a tube 1341.

Figure 2:
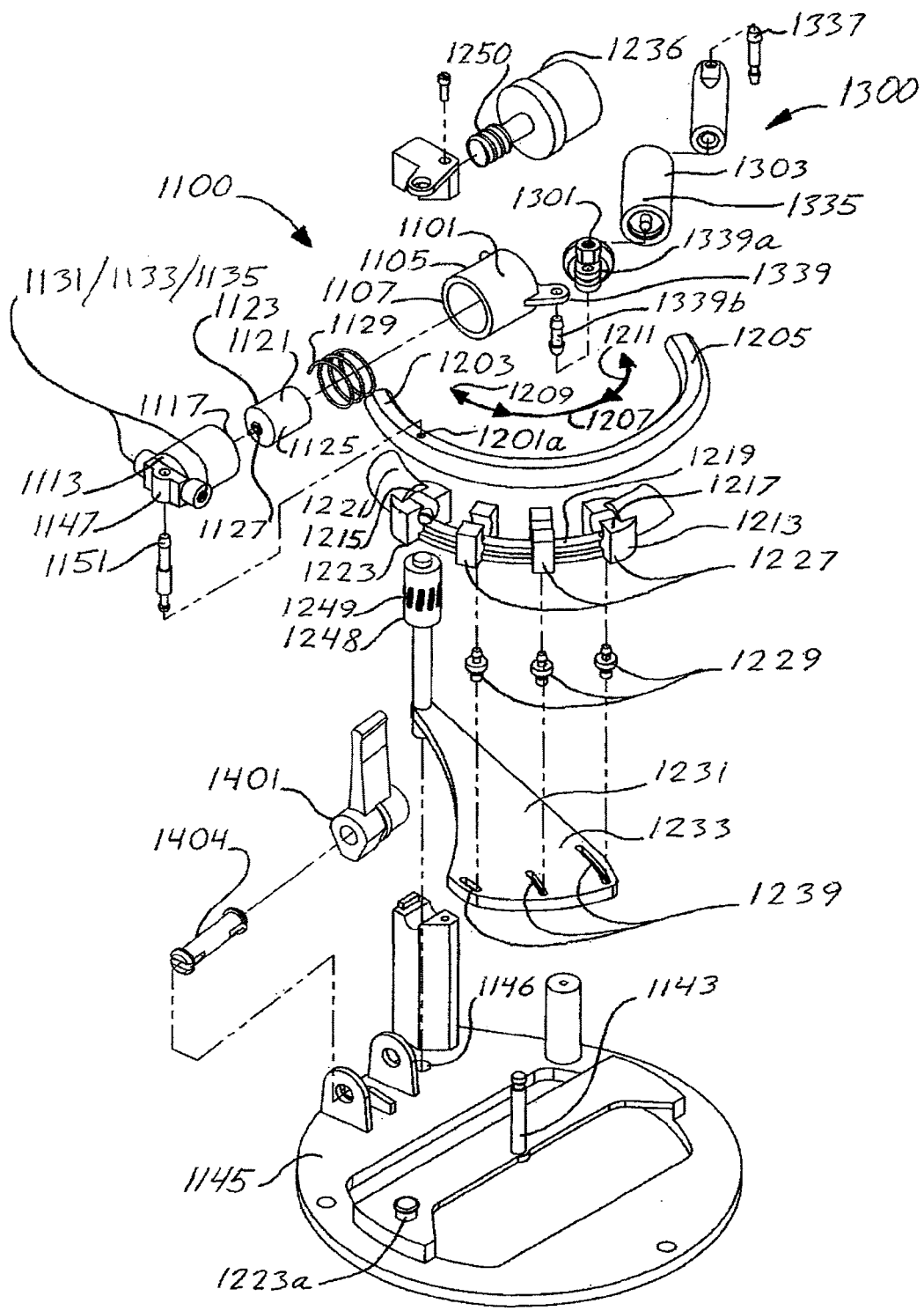
FIG. 2 is an exploded view of the fluid delivery device 1000.
Figure 3:
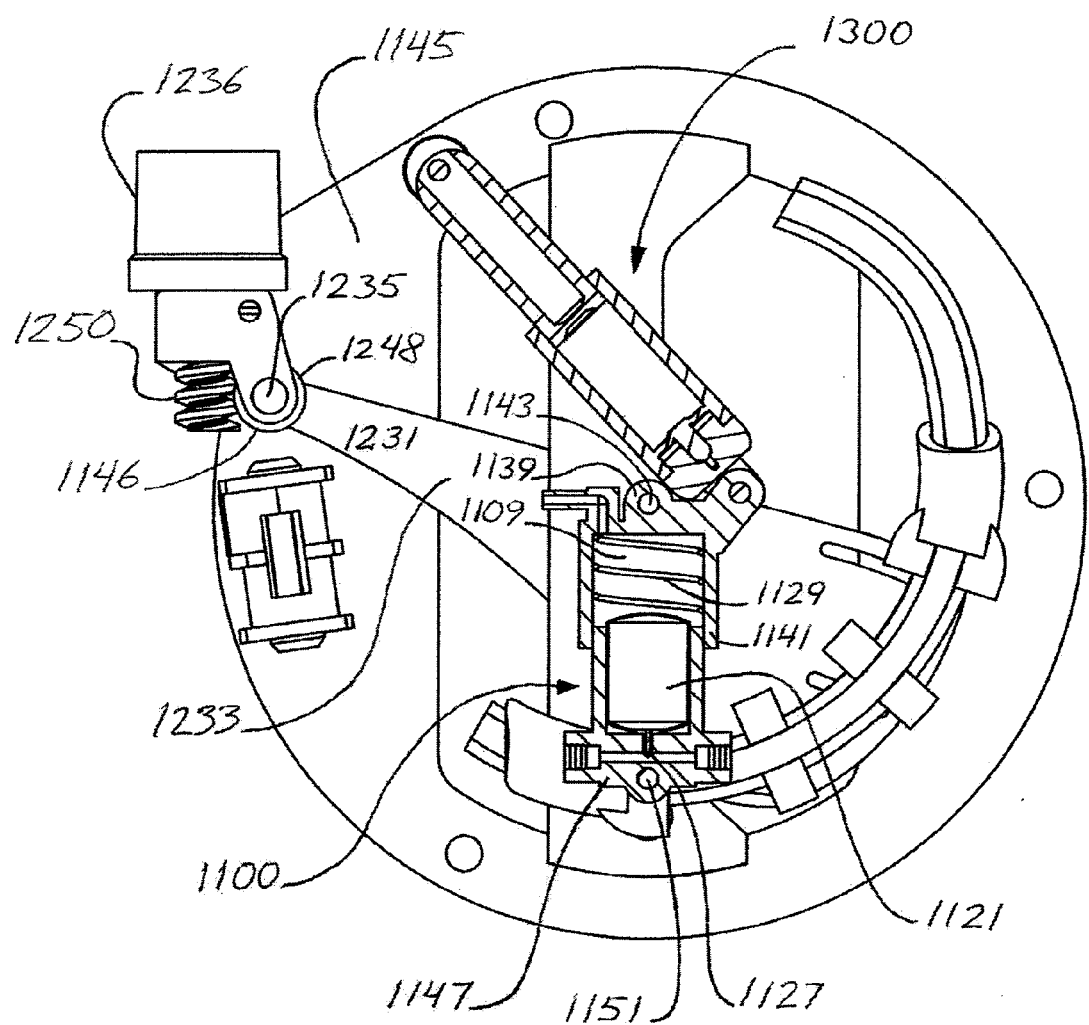
FIG. 3 is a partial cutaway of the fluid delivery device 1000.
Figure 4:
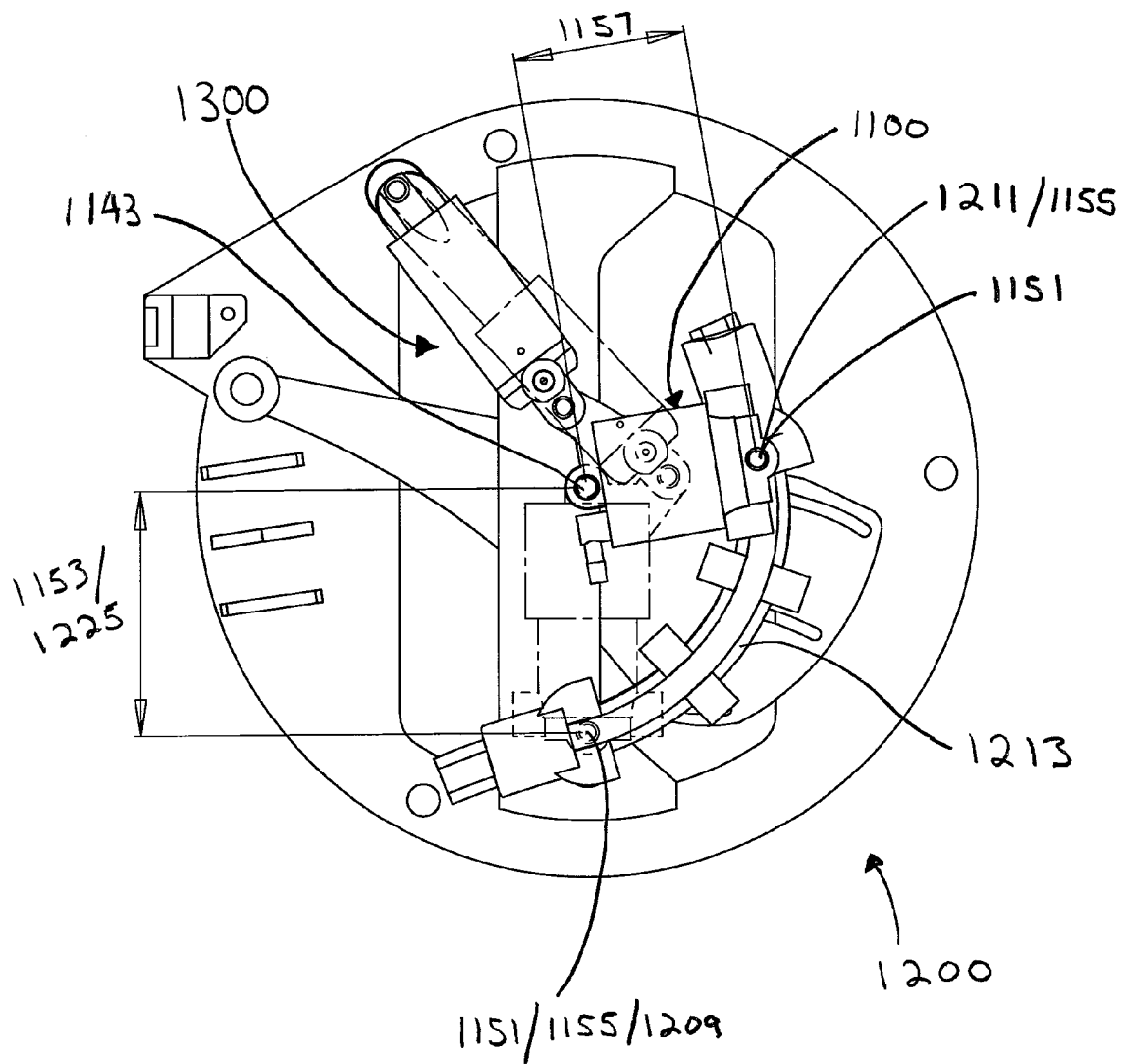
FIG. 4 is a partial plan view of the fluid delivery device 1000 showing the piston assembly 1100 and the pneumatic aspirator 1300 in a first and second position.
Figure 5:
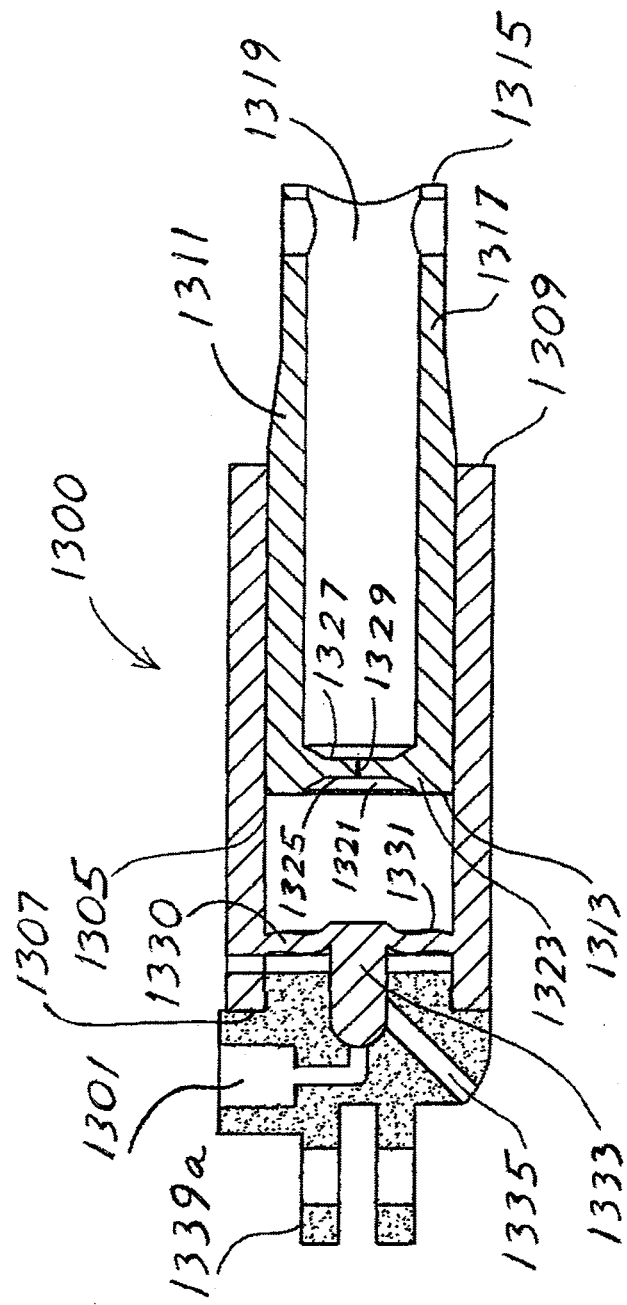
FIG. 5 is a sectional view of the pneumatic aspirator 1300.

Referring to drawings, on FIGS. 1 and 2 there is shown a hydraulic switch 1401 that controls flow of fluid into and out of current device. Preferably this switch is a manually operated toggle switch that may assume a first position henceforth known as dispense position, and a second position henceforth known as refill position. The switch resides on a shaft pin 1404 that is mounted on base plate 1145. When in the dispense position, said switch causes flexible tube 1402 to be pinched, and a second flexible tube 1403 to be un-pinched or unobstructed. When in refill position, tube 1402 is caused to be un-pinched and tube 1403 becomes pinched. Tube 1402 forms a fluid conduit between the first port of the 1131/1133/1135 port pair and the consumer of the fluid to be dispensed, such as a negative pressure vessel, an eductor or an airbrush nozzle. Tube 1403 forms a fluid conduit between the second port of the 1131/1133/1135 port pair and an external fluid store responsible for effecting refills of the current device. The fluid that is used to resupply the current device via tube 1403 must be above atmospheric pressure, as the fluid bag 1123 is designed to draw in materially no air as its contents are emptied during use of the currently taught device. Therefore there is no need for additional means or plumbing to evacuate air from the said bag's volume 1121. However, the bag must be inflated or expanded by the refilling fluid's pressure.

Although particular embodiments of the invention have been described in detail herein with reference to the accompanying drawings, it is to be understood that the invention is not limited to those particular embodiments, and that various changes and modifications, including the omission of steps or the inchangability of the order of steps, may be effected therein by one skilled in the art without departing from the scope or spirit of the invention.

What is claimed:

1. A fluid delivery device for delivering a fluid comprising:
a piston assembly, the piston assembly including:
a receiver cup having a cup base wall and a cup sidewall connected to the cup base wall and extending therefrom to form a cup rim, thereby forming a receiver volume existing between the cup base wall, the cup sidewall, and the cup rim;
a plunger housing adapted to sealably and slidably fit within the receiver cup, the plunger housing having a plunger base wall and a plunger wall connected to the plunger base wall and extending therefrom to form a plunger rim, thereby forming a plunger volume existing between the plunger base wall, the plunger wall, and the plunger rim;
a collapsible reservoir disposed within the plunger volume for containing the fluid and having at least one reservoir wall defining and enclosing a reservoir volume, and at least one reservoir port extending through the reservoir wall for communicating the fluid with the reservoir volume;
a spring inset within the receiver volume of the receiver cup disposed to engage the receiver cup and the plunger housing for resisting compression of the plunger housing within the receiver cup; an inlet and an outlet for communicating the fluid with the at least one reservoir port;
a receiver cup port extending through the receiver cup for regulating a fluid piston pressure within the receiver cup and within the plunger housing that is exerted on the collapsible reservoir,
a pneumatic aspirator connected to the receiver cup port for regulating the fluid piston pressure by selectively controlling a flow of air in or out of the receiver cup port,
a fixed pivot mount connected to or forming part of the receiver cup at a base wall end for connecting with a fixed pivot of a baseplate;
a translatable pivot mount connected to or forming part of the plunger housing at a plunger base wall end or connecting with a translatable pivot;
wherein, the fixed pivot mount is connected with the fixed pivot, the translatable pivot mount is connected with the translatable pivot, the translatable pivot is caused to travel from a first radial distance from the fixed pivot to a radial endpoint having a second radial distance, the second radial distance being less in distance from the fixed pivot than the first radial distance, thereby causing the plunger housing to slide further in the receiver volume and increase the fluid piston pressure; the pneumatic aspirator is disposed to stop the flow of air out of the receiver cup when the plunger housing slides into the receiver volume, the fluid piston pressure thereby exerted on the collapsible reservoir causes the collapsible reservoir to collapse, ejecting the fluid contained therein through the at least one reservoir port.

2. The fluid delivery device of claim 1, further including a translatable pivot guide system for selectively varying the second radial distance of the translatable pivot mount to the fixed pivot, the system comprising:
a cord having a first end and a second end, the first end attached to the translatable pivot for moving the translatable pivot along a path from a startpoint to an endpoint when a pulling force is applied to the second end;
a track for forming the path traveled by the translatable pivot, the track having:
a start end and a finish end, connected to a cord side and mount side,
the start end having a track pivot mount for pivotably fixing the start end to the baseplate at a baseplate pivot pin and for defining the startpoint having a non-variable radial distance from the fixed pivot,
the finish end defining the endpoint,
the cord side including at least one retainer for holding the cord to the cord side of the track as the cord slides along the track and for constraining the travel of the first end of the cord as said first end of the cord travels along the path from the startpoint to the endpoint,
the mount side mates to one or more guide pins extending outwardly for shaping the path traveled by the translatable pivot;
a guideplate for shaping the path formed by the track, the guideplate having:
a surface existing on a plane parallel to the baseplate, a guideplate pivot extending along an axis perpendicular to the surface of the guideplate, rotatably connected to the baseplate via a guideplate pivot mount, for allowing the surface to rotate relative to the axis and the baseplate when a user rotates the guideplate pivot, one or more guide channels extending through the surface for cooperating with the one or more guide pins of the track, the one or more guide channels shaped to cause the finish end of the track to vary in distance from the fixed pivot as the guideplate is selectably rotated about the axis;

wherein, the guideplate is rotated to a first position relative to the baseplate, the guide channels cooperate with the one or more guide pins of the track to cause the track to axially deform such that the finish end of the track has the radial endpoint at an initial second radial distance from the fixed pivot, the fluid piston pressure thereby exerted on the collapsible reservoir relatable to the initial second radial distance, causing the collapsible reservoir to collapse to a degree relatable to the initial second radial distance, when the translatable pivot travels from the start end to the finish end, ejecting a volume of the fluid contained therein also to a degree relatable to the initial second radial distance; and wherein, the guideplate is rotatable to a second position relative to the baseplate where the guide channels cooperate with the one or more guide pins of the track to cause the track to axially deform such that the finish end of the track has the radial endpoint at an other second radial distance differing from the initial second radial distance the fluid piston pressure thereby exerted on the collapsible reservoir relatable to the other second radial distance, causing the collapsible reservoir to collapse to a degree relatable to the other second radial distance, when the translatable pivot travels from the start end to the finish end, ejecting a volume of the fluid contained therein also to a degree relatable to the other second radial distance.

3. The fluid delivery device of claim 2, the pneumatic aspirator having an aspirator port, the aspirator port having an aspirator port pressure and in communication with the receiver cup port, comprising:

a pneumatic cylinder having a sidewall forming a first rim and a second rim;

a pneumatic plunger for slidably fitting within the sidewall of the pneumatic cylinder at the second rim, comprising:

a proximal end, a distal end, at least one wall connecting the proximal end to the distal end, and a plunger passageway for allowing air to flow from the proximal end to atmosphere at the distal end, and a pressure actuated valve fixed to the proximal end of the pneumatic plunger having a periphery connecting a first surface to a second surface, and an orifice extending from the first surface to the second surface, the orifice disposed to be normally closed and to open to allow the flow of air through the valve into and/or out of the plunger passageway at a first pressure differential across the valve;

a diaphragm sealably fixed within the sidewall at or near the first rim having a plunger facing surface that faces the proximal end of the plunger for responding to a cylinder pressure existing between the pressure actuated valve and the plunger facing surface;

a poppet valve mechanically coupled to the diaphragm and disposed to communicate flow between the aspirator port and atmosphere via a passageway when the pressure seen at the aspirator port exceeds the pressure exerted against the plunger facing surface;

the distal end of the pneumatic plunger is pivotably mounted to a fixed plunger pivot, and the pneumatic cylinder is pivotally mounted to an offset pivot mount of the receiver cup so as to enable the proximal end to slidably travel towards or away from the diaphragm as the translatable pivot travels to or from the startpoint to the endpoint;

wherein, during dispensing, as the cord is pulled to cause the translatable pivot mount to travel from the startpoint to the endpoint, the offset pivot mount rotates about the fixed pivot causing the proximal end to slidably travel towards the diaphragm thereby exerting a pressure against the plunger facing surface that is greater than the aspirator port pressure, and wherein, during reset, as the translatable pivot mount travels from the endpoint to the startpoint, the offset pivot mount rotates about the fixed pivot mount causing the proximal end to slidably travel away from the diaphragm thereby exerting a pressure against the plunger facing surface that is less than the aspirator port pressure, which unseats the poppet valve causing the flow of air to flow from the passageway to the receiver volume via the aspirator port and the receiver cup port, which are connected via a tube.

* * * * *